Nov. 1, 1966 H. B. BERNSTEIN 3,283,269

TAPPED DELAY LINE

Filed March 12, 1962

INVENTOR.

HOWARD B. BERNSTEIN

BY

OSTROLENK, FABER, GERB & SOFFEN

ATTORNEYS

United States Patent Office 3,283,269 Patented Nov. 1, 1966

3,283,269
TAPPED DELAY LINE
Howard B. Bernstein, New York, N.Y., assignor to Bel Fuse Inc., Jersey City, N.J., a corporation of New Jersey
Filed Mar. 12, 1962, Ser. No. 178,992
5 Claims. (Cl. 333—29)

This invention relates to an electrical delay line and more particularly to a tapped artificial delay line having a minimum amount of reflection from the unused section of the line.

In many electrical circuits it is necessary to introduce a time delay in the transmission path of electrical signals. A typical example is the home television receiver wherein the various pulses derived from the received signal must be sequentially synchronized to yield the desired picture. It is well known in the art to construct an artificial delay line to provide the requisite amount of delay within a practically realizable length. Such artificial delay lines include an electrically connected array of inductive and capacative elements which may be either of distributed or lumped constant. A typical structure of a distributed constant delay line is a number of turns of wire wound about a dielectric core with a conductive ground plane intermediate the turns and the core. The inductance of the coils, and their capacity to the ground plane effect the desired signal delay.

It is frequently desirable to provide for a variation of the circuit delay introduced by such delay lines to permit a fine adjustment of the delay. Accordingly, variable delay lines have been constructed to permit a tap-off of a segment of their total delay. This invention is an improvement over the types of such variable delay lines presently available.

Attempts have previously been made, in a way somewhat analogous to that of the adjustable resistor, to use an intermediate contact to tap-off the desired amount of delay from one end section of a continuously wound delay line. A disadvantage of such tapped distributed constant delay lines is the signal degradation caused by reflections from the unused section of the line. That is, the portion of the delay line external to the portion between the end terminal and the intermediate terminal is electrically connected to the circuit and provides a source of signal reflection.

My invention provides a structure wherein an adjustable portion of one delay line may be tapped off without adversely effecting the signal because of reflections from the unused portion. Basically the delay line of this invention is constructed of individual discrete sections or, in effect a plurality of lesser delay lines. Connections may be made between the various sections to provide the desired delay. The unused sections of the delay line are electrically isolated from the used section to reduce substantially, or eliminate completely, the presence of reflected signals.

One form which this invention may take contemplates the use of a plurality of discrete sections of insulated wire wound about a coil form containing a ground plane. Each section contains a number of turns of wire, either single layer or complex wound, having a terminal at each end. The discrete sections are adjacently arrayed along the length of the coil form. Their ends are brought out to externally accessible terminals. Terminals of adjacent ends of adjacent discrete sections are adjacent each other to permit the series connection of any desired number of individual discrete sections. Should it be desired to obtain only the delay of, for example, two of the discrete sections, a series connection is made between the adjacent end terminals of the two sections. Their remote end terminals are then connected to the external circuit. The other discrete sections of the delay line structure will thereby be electrically isolated from the tapped sections, preventing signal reflection.

To simplify the manufacture of my invention each of the individual discrete sections would contain the same number of turns. Such a structure could only provide a gross signal delay which is an integral multiple of the delay provided by each of the individual discrete sections. An improved embodiment of my invention permits increased variation of the over-all delay by the addition of individual stepped sections of lesser delay than the main discrete sections. The selective connection of such lesser sections would therefore permit gross delay intermediate multiples of the other delay line sections.

In a modified version, my invention may utilize a sliding contact or wiper assembly traversing a longitudinal slit of the delay line wherein the wire insulation of each delay segment or section has been removed. This permits a tap-off at any point of a section intermediate its ends. Where such an intermediate tap-off is made, the only portion of the unused delay line which will be electrically connected to the circuit is that small portion of the discrete section containing the wiper assembly. In prior devices which have a continuously adjustable wiper assembly, the entire portion of the over-all delay line external to the first terminal and the wiper assembly are electrically connected to the circuit. The present novel invention by reason of its continuously adjustable wiper assembly will exhibit an appreciably lower disruptive signal reflection especially since the portion of the discrete segment which is still connected to the tapped off delay segment is relatively small and therefore has relatively negligible effect.

The combination of discrete delay line sections which may be connected in series for the gross desired delay plus the wiper or contact element which may then adjust the section of delay line used within a range determined by the length of the last discrete section or segment in series creates a fully adjustable delay line having either no spurious signal reflection or one in which the possibility of spurious signal reflections is reduced to a minimum.

It is accordingly a primary object of this invention to provide a tapped delay line exhibiting a minimum amount of signal reflection.

Another object of this invention therefore is to provide an artificial transmission delay line comprised of individual discrete sections which may be series connected to provide for a desired amount of signal delay less than the total delay of the line.

A further object of the present invention is to provide a distributed constant delay line constructed of a longitudinal array of individual discrete sections of insulated wire wound about a single core structure.

Still another object of this invention is to provide a tapped distributed constant delay line wherein any desired number of individual discrete sections may be series connected while the remaining unused sections of the over-all delay line are electrically isolated therefrom.

Still a further object of this invention is to provide a tapped distributed constant delay line constructed of individual discrete sections and a stepped array of lesser delay line sections wherein provision is included for the series connection of a selected number of such sections while the remaining sections of the over-all delay line are electrically isolated therefrom.

Yet another object of this invention is to provide a continuously adjustable distributed constant delay line comprised of a series connectible array of individual discrete sections and a wiper arm or contact to electrically engage, connect and use any portion within one of the individual sections.

Yet a further object of the present invention is to provide a continuously adjustable delay line wherein only a small portion of the remaining unused portion of the delay line is electrically connected to the external circuit, thereby obviating spurious or undesired signals or reflections.

These and other objects of this invention will become apparent from the following description and drawings in which.

Figure 1:
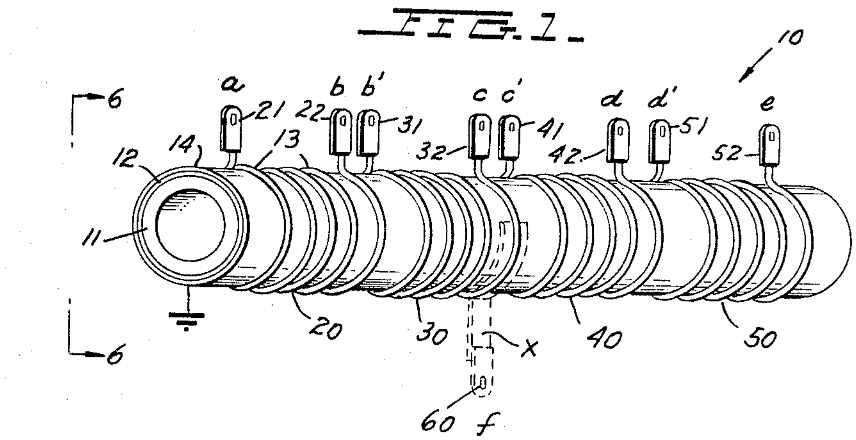
FIG. 1 PRIOR ART
FIGURE 1 is a perspective view of a typical illustrative embodiment of my invention showing the series connector elements as well as the wiper or contact element.

Referring particularly to FIGURE 1, delay line 10 is comprised of a number of discrete sections 20, 30, 40, 50 of individual delay lines wound about central coil form 11. Although shown as a hollowed cylinder, coil form 11 may also be solid. Likewise it may be round, rectangular or elliptical in cross-section or have any other transverse proportion or cross-section to obtain the required length, spacing and structural characteristic of the delay line segments. Coil form 11 is preferably formed of insulating material such as glass, paper tubing or a ceramic, or at least has a surface of insulating material; the entire coil form preferably has a dielectric constant as close to one as possible. A conductive layer of material 12, is placed on coil form 11 and is connected to ground potential to form a ground plane. Ground plane 12 may be of any appropriate conductive material such as copper foil, aluminum foil, silver paint or any other suitable material. Ground plane 12 may be formed of a single conductive element over the entire length of coil form 11, or may be formed of a number of strips of such conductive elements. The small amount of coupling existing between adjacent discrete sections via ground plane 12 has been found to have only a negligible effect on the characteristics of the signal being transmitted.

Should it be desirable to provide for an additional amount of capacitance in excess of that obtained between the coil windings and the ground plane, several of these strips, or similar conductive patches may be isolated from ground potential. As well known in the delay line art, the location of such free floating conductive elements about the ground plane element yields increased bridge capacitance. An insulating film 14 is provided between ground plane 12 and the coil sections wound thereabouts to prevent shorting of the windings to ground. The windings will generally, but not necessarily, be of insulated wire. Of course, in any embodiment where wiper X is used, the wire if coated must be stripped to permit electrical contact therewith.

Each of the individual discrete delay sections (20, 30, 40, 50) is formed of a number of turns of insulated wire 13 wound about the coil form 11. The inductance of the coil winding 13 their capacity to the ground plane 12 and any additional bridge capacitance establish a distributed constant artificial delay line. The individual coils have their ends (*a, b; b', c; c', d; d', e*) connected to terminal connectors 21, 22; 31, 32 etc. These terminal connectors are externally accessible and are adjacently positioned to permit series connection of the individual coils. For example, should it be desired to connect coils 20, 30 and 40, an electrical connection will be made between terminals 22–31 and 32–41.

Figure 2:
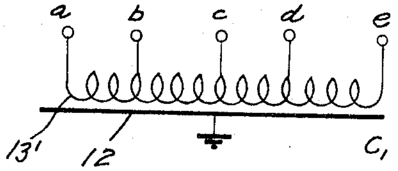
FIGURE 2 is a schematic representation of a typical tapped delay line of the type previously used.
Figure 3:
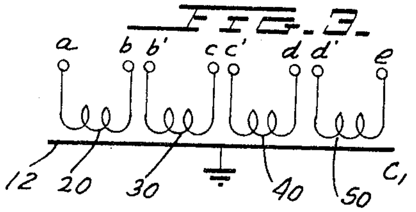
FIGURE 3 is a schematic representation of the tapped delay line in FIGURE 1 utilizing only the series connector elements.

To illustrate the principle of operation of my invention, reference is now made to the schematic representations of FIGURES 2 and 3. In the prior devices as illustrated in FIGURE 2, a continuously wound coil 13' would be typically disposed about a coil form similar to coil form 11 of this invention. A number of intermediate taps, *b, c, d* (FIGURE 2), are provided along the length of the coil form to permit tap-off of a desired segment of the over-all length of the delay line. Thus, should it be desired to utilize only one-half of the delay line terminal connections will be made to terminals *a* and *c*. It is seen however, that the unused portion of the delay line between terminals *c* and *e* (FIGURE 2) will still be electrically connected to the circuit. The electrical connection of such an unused portion of the delay line causes signal reflection and such signal reflections have an adverse effect on the signal being transmitted through tapped portion *a–c* of the delay line.

Referring to FIGURE 3, this invention provides a number of individual discrete sections which comprise the over-all delay line. These sections are electrically isolated from one another. End terminal connections may be made to and between desired sections to establish the desired amount of delay. That is, should it be desired to utilize one-half the delay line, connections will be made between ends *b* and *b'* (terminals 22 and 31 of FIGURE 1) and the end terminal connections will be made to section ends *a* and *c* (end terminals 21 and 41 of FIGURE 1) in this arrangement. Delay line sections 40 and 50, external to the tapped portion of the delay line 10, are now electrically isolated from that tapped portion.

Delay line 10 may typically be operative with either pulse or sine wave signals. In the case of pulse signals, they may typically have a repetition rate of several kilocycles to 50 megacycles, rise times in the order of a few tenths of a nanosecond to half a microsecond, and pulse widths varying from a few nanoseconds to several microseconds. Typical sine wave signals may vary from a few kilocycles to 125 megacycles. The nature of the unwanted reflections avoided by the instant invention result from unterminated sections of the delay line presenting a complex impedance. Typically, should a prior art type of delay line (per FIGS. 2 or 4) be used with the tap at about the midpoint, the signal reflections from the nondisconnected portion of the line can have a reflected discontinuity in the order of 30% of the pulse amplitude, as can readily be discerned from an oscilloscope analysis of the signal waveform. By employing the structure of the instant invention, as shown in FIG. 3 or 5, these reflections have been found to be reduced to less than 3%. In the case of sine waves, the standing wave reflections due to the complex impedance of the unused portion of the line will be in the order of ten times as great as when the unused sections are disconnected. Thus, according to the instant invention, the electrical isolation of the unused segment of the delay line prevents the generation of appreciable signal reflections which have been present in the tapped delay lines of the prior devices which utilized tapped elements but failed to isolate the unused elements of the line.

Each of the sections 20, 30, 40, 50 may be identically constructed of the same number of turns to provide the same amount of signal delay. In addition, a stepped array of lesser delay line sections might be provided for increased flexibility of gross delay. For example, should each of the sections 20, 30, 40, 50 be constructed of five turns there would also be included a four turn, three turn, two turn and one turn section. This would permit a gross delay intermediate multiples of the five turn sections without the necessity of a movable wiper arm or contact.

Figure 4:
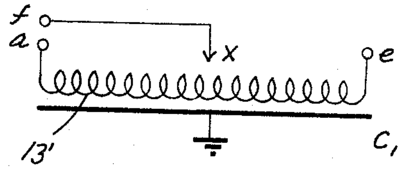
PRIOR ART FIG. 4
FIGURE 4 is a schematic representation of a continuously adjustable tapped delay line of the type previously used.
Figure 5:
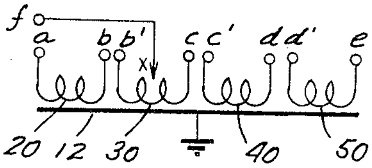
FIGURE 5 is a schematic representation of a continuously variable tapped delay line of the present invention showing schematically the utilization of the wiper arm or contact of FIGURE 1 to connect a portion of one of the discrete delay segments in the delay circuit.

FIGURE 4 schematically illustrates a continuously variable distributed constant delay line of prior devices. A wiper contact X which transverses the length of the continuously wound coil 13' is connected to an external circuit terminal *f*. Wiper contact X may be moved along the winding to provide any desired amount of tapped delay between terminals *a* and *f*. In this arrangement it will be seen that the complete unused portion of the delay line (between wiper contact X and terminal *e*) will still be electrically connected to the circuit. The presence of such an appreciable segment of the delay line connected to the used portion of the delay line will effect signal degradation as a result of reflections.

Referring to FIGURE 5, which illustrates such a continuously adjustable variable delay line in accordance with the teachings of this invention, a number of discrete individual sections of delay line 20, 30, 40, 50 are shown in place of the continuously wound delay line of the prior art. Should wiper contact arm X be positioned at a selected point within section 30, a connection will be made between ends *b* and *b'* (terminals 22 and 31 of FIGURE 1) to provide continuity of sections 20 and 30. The tapped-off portion of the delay is between terminals *f* and *a* with only the small segment between terminals *c* and wiper contact X being electrically connected thereto. This appreciable reduction in the length of unused delay line results in a corresponding decrease in signal reflection and in a reduction in resulted signal degradation.

Figure 6:
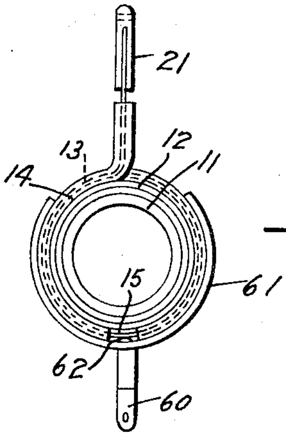
FIGURE 6 is an end view showing the wiper assembly connection, taken along line 6—6 of FIGURE 1 and looking in the direction of the arrows.

FIGURE 6 shows by way of illustration one way in which wiper contact arm X may be connected to delay line 10. A plurality of aligned slits 15 are formed in the insulation of each of the turns of each discrete section to provide external access to their individual windings. These slits are aligned to form a longitudinal slit at a surface annularly spaced from the coil terminals so that the wiper contact X may move freely without interfering with terminal connections. Wiper contact arm X includes an external circuit terminal 60 which is electrically connected to embossed contact surface 62. Contact surface 62 enters slit 15 to make electrical contact with the individual windings. Spring-like member 61 is disposed about the exterior surface of coil 10 to maintain wiper contact arm X in position and in effective electrical contact.

This invention therefore makes it possible to connect together discrete delay sections of a delay line and tap off the desired length while absolutely avoiding spurious signals arising from reflections from other unconnected and unused portions of the delay line. Also, this invention makes it possible where some unexpected length of delay line is required, to reduce the possibility of spurious signals arising from reflections, to those signals only which occur by reason of the connection beyond the tap point of only a small unused part of a discrete section of the delay line.

In the foregoing, this invention has been described in connection with preferred illustrative embodiments. Since may variations and modifications will now be obvious to those skilled in the art, I prefer to be bound, not by the specific disclosures herein contained, but only by the appended claims.

I claim:

1. A delay line comprising a support structure of insulating material having a first and second end; a plurality of distinct inductive sections of electrically conductive material about said support structure; said distinct inductive sections including a first end section, a plurality of intermediate sections and a second end section; each of said sections being an integrally formed conductive winding having a first terminal at one end thereof, an intermediate portion wound about said support structure, and a second terminal at the opposite end thereof; said terminals defining the absolute extremities of their respective conductive windings; a capacitance producing conductive surface adjacent said inductive sections and about said support structure; said first terminal of said first end section located at said first end of said support structure; said second end terminal of said first end section located adjacent the first end terminal of one of said intermediate sections, with the second end terminals of each of said intermediate sections located adjacent the first end terminal of the next-adjacent intermediate section, the second end terminal of the final intermediate section located adjacent the first end terminal of said second end section, and the second end terminal of said second end section located at said second end of said support structure; means for electrically connecting the second end terminals of a predetermined number of said inductive sections to the first end terminals of the adjacent first terminals of successive inductive sections, such that said predetermined number of successive inductive sections are electrically connected to form a series connection of their individual windings which excludes the windings of the remaining unconnected inductive sections, and said remaining unconnected inductive sections are electrically isolated from the series connected inductive section; said inductive sections and the terminals thereof being aligned along said support structure to facilitate the series electrical connection of said predetermined number of inductive sections.

2. A delay line comprising a support structure of insulating material; a plurality of distinct inductive sections of electrically conductive material about said support structure; a capacitance producing conductive surface adjacent said inductive sections and about said support structure; each of said inductive sections having a terminal at each end; said inductive sections and the terminals thereof being aligned along said support structure to facilitate the series electrical connection of said inductive sections; each of said inductive sections being electrically isolated from all the other inductive sections; said aligned terminals providing means for connecting a selected number of inductive sections in series; the remaining unconnected inductive sections being electrically isolated from the series connected inductive sections; at least one of said inductive sections being of lesser inductance and said lesser inductive section being a stepped function of the other inductive sections.

3. A delay line comprising a support structure of insulating material; a plurality of discrete electrically conductive windings on said support structure; a ground plane conductive surface between said support structure and said winding; said windings being insulated from said ground plane conductive surface; said windings each having a plurality of turns insulated from each other; at least one of said windings having a lesser number of turns; and said lesser number of turns being a stepped function of the other windings; each winding having a terminal at each end; said windings and the terminals thereof being aligned along said support structure to facilitate series connection of said windings; each of said windings being electrically isolated from all of the other windings; said aligned terminals providing means for connecting a selected number of windings in series, the remaining unconnected windings being electrically isolated from the series connected windings.

4. A delay line comprising a support structure of insulating material; a plurality of discrete electrically conductive windings on said support structure; a ground plane conductive surface between said support structure and said winding; said windings being insulated from said ground plane conductive surface; said windings each having a plurality of turns insulated from each other, each winding having a terminal at each end; said windings and the terminals thereof being aligned along said support structure to facilitate series connection of said windings; each of said windings being electrically isolated from all of the other windings; a movable contact having a contact element engageable with selected turns of selected windings; said aligned terminals providing means for connecting a selected number of windings in series to one end of an other winding, said contact providing a connection to one of the turns of said other winding and connecting a portion of said other winding in series to the first connected series of windings, the remaining unconnected windings being electrically isolated from the series connected windings; a longitudinal slit along the insulation of each of said windings to receive said movable contact and provide access to the turns thereof; said individual longitudinal slits being annularly spaced from said aligned terminals.

5. A delay line comprising a generally cylindrical support structure of insulating material having a first and second end; a plurality of axially aligned discrete electrically conductive windings about said support structure; said discrete windings including a first end winding, a plurality of intermediate windings and a second end winding; each of said windings being an integrally formed conductive winding having a first terminal at one end thereof, an intermediate portion wound about said support structure, and a second terminal at the opposite end thereof; said terminals defining the absolute extremities of their respective conductive windings; the length of said support structure approximating the sum of said discrete winding length; a conductive ground plane intermediate said support structure and said discrete sections; said windings being insulated from said ground plane conductive surface; said first terminal of said first end winding located at said first end of said support structure, said second end terminal of said first end winding located adjacent the first end terminal of one of said intermediate windings, with the second end terminals of each of said intermediate windings located adjacent the first end terminal of the next adjacent intermediate winding, the second end terminal of the final intermediate winding located adjacent the first end terminal of said second end winding, and the second end terminal of said second end winding located at said second end of said support structure; means for electrically connecting the second end terminals of a predetermined number of said windings to the first end terminals of the adjacent first terminals of successive windings, such that said predetermined number of successive windings are electrically connected to form a series connection of their individual windings which excludes the windings of the remaining unconnected windings, and said remaining unconnected windings are electrically isolated from the series connected inductive sections; said windings and the end points thereof being adjacently aligned along said support structure to facilitate the connection and disconnection of predetermined ones of said windings.

References Cited by the Examiner

UNITED STATES PATENTS

| | | | |
|---|---|---|---|
| 2,070,570 | 2/1937 | Batchelder | 333—29 |
| 2,263,376 | 11/1941 | Blumlein | 333—29 |
| 2,478,778 | 8/1949 | Oliver | 333—29 |
| 2,608,623 | 8/1952 | Cutler | 333—29 |
| 2,727,213 | 12/1955 | Lucas | 333—29 |
| 2,801,351 | 7/1957 | Calvert | 333—30 |
| 2,892,162 | 6/1959 | Bennett | 333—29 |
| 3,013,259 | 12/1961 | Bleam | 333—29 |
| 3,034,062 | 5/1962 | Bleam | 333—30 |
| 3,085,214 | 4/1963 | Dewey | 333—31 |
| 3,173,111 | 3/1965 | Kallman | 333—29 |

HERMAN KARL SAALBACH, *Primary Examiner.*

C. BARAFF, *Assistant Examiner.*